US005106305A

United States Patent [19]

Grant

[11] Patent Number: 5,106,305

[45] Date of Patent: Apr. 21, 1992

[54] PICTURE MAKING KIT

[76] Inventor: Michael Grant, 43 Forty Avenue, Wembley, Middlesex HA9 8JN, England

[21] Appl. No.: 536,580

[22] PCT Filed: Dec. 28, 1988

[86] PCT No.: PCT/GB88/01116

§ 371 Date: Jul. 3, 1990

§ 102(e) Date: Jul. 3, 1990

[87] PCT Pub. No.: WO89/06603

PCT Pub. Date: Jul. 27, 1989

[30] Foreign Application Priority Data

Jan. 4, 1988 [GB] United Kingdom ................. 8800038

[51] Int. Cl.[5] .............................................. G09B 11/10

[52] U.S. Cl. .......................................... 434/84; 434/96

[58] Field of Search ....................... 434/84, 85, 81, 90, 434/96, 95, 72, 75, 76, 368, 370, 427

[56] References Cited

U.S. PATENT DOCUMENTS 572,216 12/1896 Patton .................................. 434/79
1,111,320 9/1914 Pearson ................................ 434/75
1,469,554 10/1923 Crowder ........................... 434/85 X
1,848,943 3/1932 Foley ................................... 434/75
2,294,131 8/1942 Raymond ............................. 434/79
2,450,127 9/1948 Gardener et al. ...................... 434/84
3,768,177 10/1973 Thomas ............................... 434/81
4,373,730 2/1983 Koltz .............................. 434/96 X
4,514,175 4/1985 Zaruba et al. .................... 434/84 X

FOREIGN PATENT DOCUMENTS 959759 6/1964 United Kingdom ................. 434/75
1549618 3/1976 United Kingdom .
2065567 12/1979 United Kingdom .
2134850 2/1984 United Kingdom .

*Primary Examiner*—Richard J. Apley
*Assistant Examiner*—Karen A. Richard
*Attorney, Agent, or Firm*—Fay, Sharpe, Beall, Fagan, Minnich & McKee

[57] ABSTRACT

The kit comprises a base sheet (2) carrying a predetermined outline or "graphic grid", a plurality of filling elements such as pieces of adhesively backed colored diffraction foil for fitting in different areas (R, B, E) of the outline, and an overlay sheet of transparent material which carries correspondingly outlined clear areas separated by opaque (preferably black) areas. The superimposition of the overlay sheet over the color filled base sheet produces a finished picture in which the colors are highlighted by the surrounding black areas.

15 Claims, 5 Drawing Sheets

PICTURE MAKING KIT

This invention relates to a kit for making pictures, of the kind comprising a graphic pattern which is adapted to be filled in by the user to produce a finished picture.

Various types of pre-designed picture kits have previously been proposed, such as the well-known "Painting by Numbers" types in which the different areas of the predetermined outline are filled in with different coloured paint which are identified by numbers printed in the different areas of the graphic pattern. The results achieved by the use of such kits are of extremely variable quality, and considerable care is required to achieve a good result. Furthermore, they can be extremely messy to use, and thus are not particularly suitable for young children.

Accordingly, the present invention provides a picture making kit comprising a base sheet carrying a predetermined pattern or "graphic grid", a plurality of filling elements which can be applied to the pattern by the user, and an overlay sheet or "master graphic" which is superimposed on the base sheet after the filling elements have been applied, and which carries a pattern of transparent, translucent, or cut-out "windows" so as to create a finished picture made up of separate areas visible through the "windows" of the overlay.

Preferably, the filling elements comprise small pieces of coloured paper, cloth, foil or plastic sheeting, which are preformed in uniform shapes such as squares, so that the picture is built up as a "mosaic".

In a preferred embodiment, a plurality of backing sheets are provided, each carrying a number of "peelable" filling elements, the rear surface of which carries an adhesive whilst each backing sheet is coated with a suitable release agent. Alternatively, the base sheet may carry the adhesive, and the filling elements themselves may be dry.

Preferably, the filling elements comprise pieces of diffraction foil, so that finished picture will have a "sparkling" appearance.

Preferably, the "master graphic" overlay comprises clear or cut-out areas each corresponding to the major part of an area of the base sheet which is designated to be filled with the filling elements, and opaque (preferably black) areas which cover the unfilled areas of the base sheet. This arrangement results in a final picture having an attractive quality of colour and depth.

In a preferred embodiment of the invention the respective areas of the base sheet are larger than the corresponding areas of the "master graphic" and may also be less accurately defined, so that the final form of the picture only appears clearly after the overlay has been added.

One embodiment of the picture kit in accordance with the invention will now be described by way of example with reference to the accompanying drawings, in which.

Figure 1:
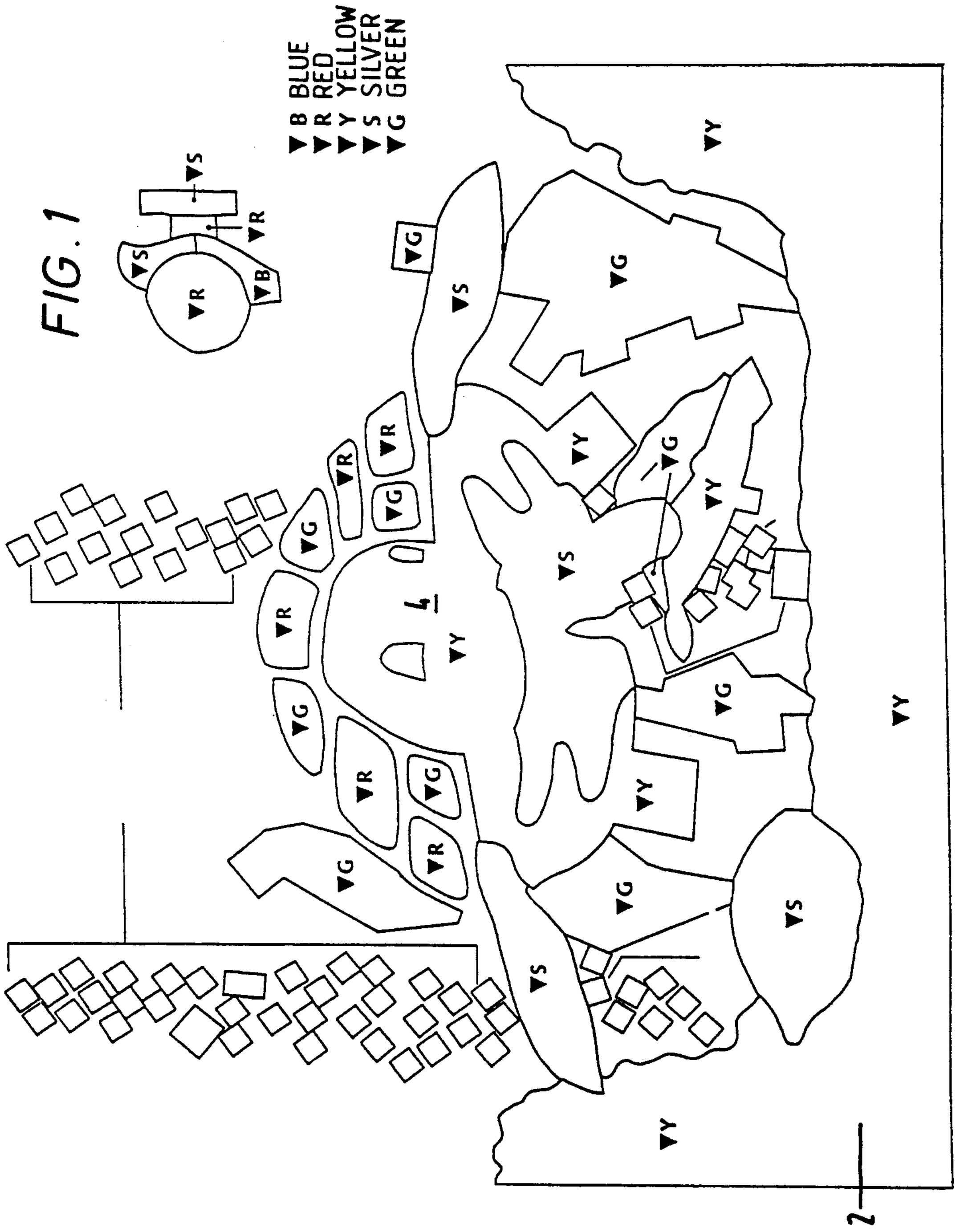
FIG. 1 shows a base sheet carrying the approximate outline of a picture.

Referring to FIG. 1, the base sheet 2 carries a "grid" defining in approximate outline, the different coloured areas of the final picture. It will be seen from this drawing, that the areas are labelled with letters such as "R", "B", and "G", indicating the respective colours of the filling elements to be applied to those areas. Alternatively, the colours may be indicated in suitable halftones. The filling elements themselves, (6), are simply squares of diffraction foil which are applied to the respective areas so as to fill them with the corresponding colour. It will be noted that the outlines on the base sheet 2, for example the area 4 in the centre of the picture which will, in fact, correspond to the head of a turtle in the final illustration, are only general outlines, and in fact the filling elements need not be particularly accurately lined up with the outlines, in order to achieve a very high quality final result.

Figure 2:
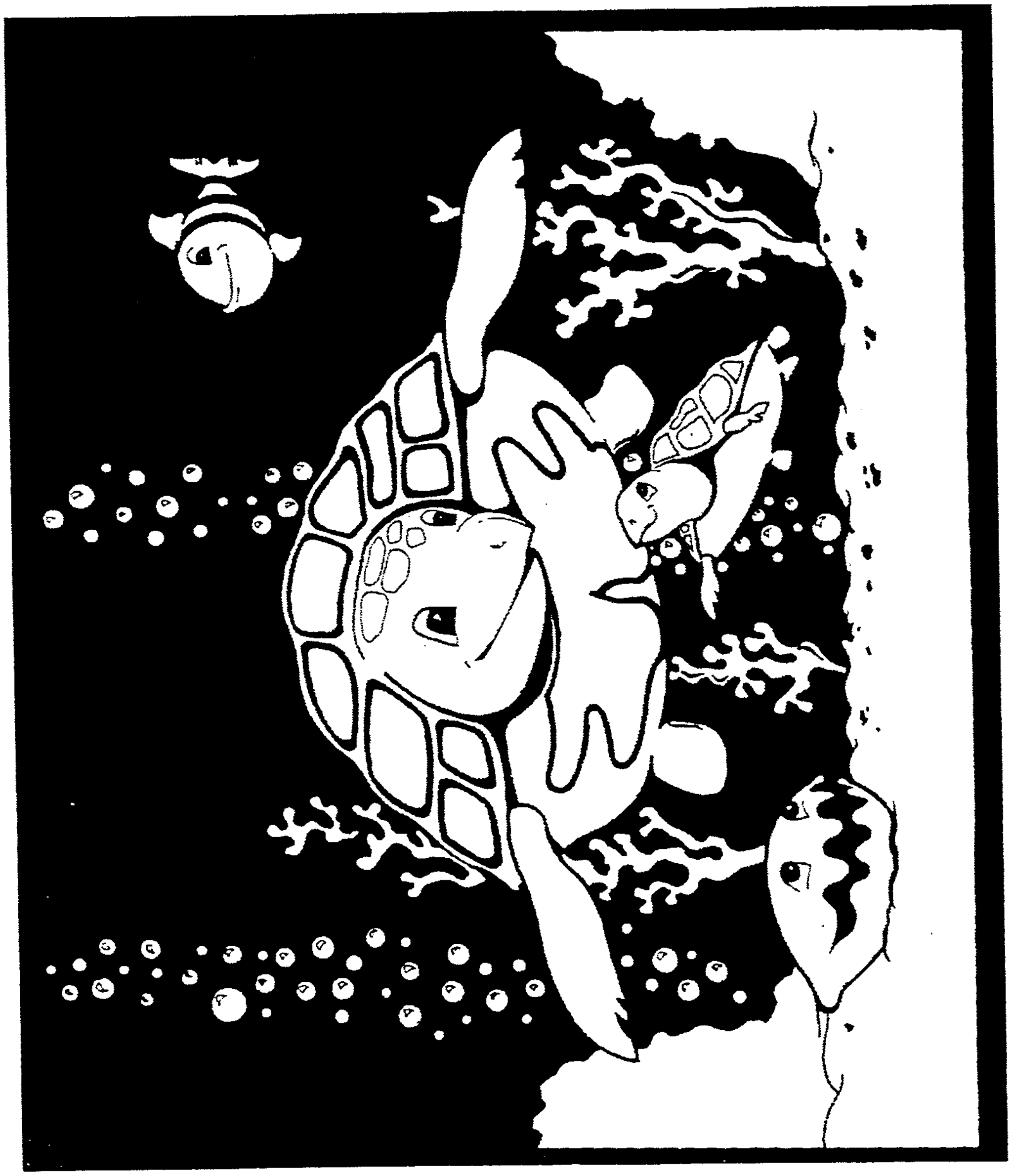
FIG. 2 shows a transparent overlay sheet carrying a corresponding pattern.
Figure 4A:
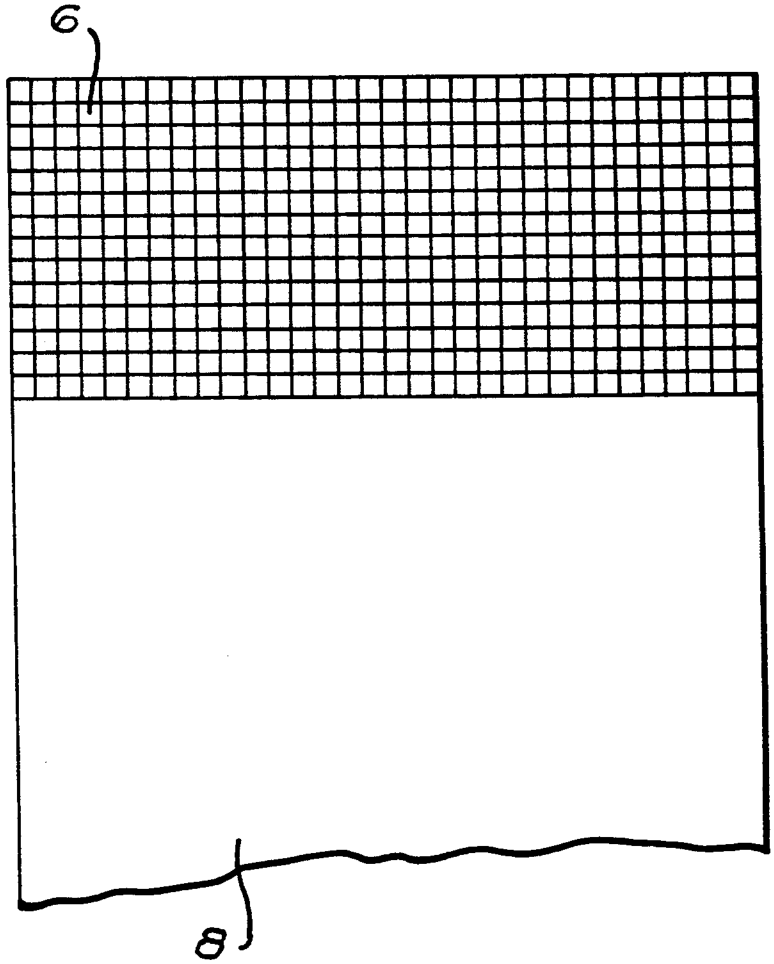
FIG. 4A shows a backing sheet carrying rows of peelable filling elements.

This is because, once all of the different coloured filling elements have been applied to the respective areas of the picture, a sheet of transparent plastic material, as shown in FIG. 2, is laid over the base sheet, and the exact pattern of the final picture is carried on this sheet in the form of a "separation overlay", that is to say it carries clear (or cut-out) areas where each colour is allowed to show through, separated by completely opaque areas. The result is a finished picture in which the individual coloured areas are sharply defined and highlighted, by the surrounding opaque areas of the overlay. As shown in FIG. 4A, the peelable filling elements 6 whose rear surface carries an adhesive are supplied on a backing sheet 8 whose surface is coated with a suitable release agent.

Figure 3:
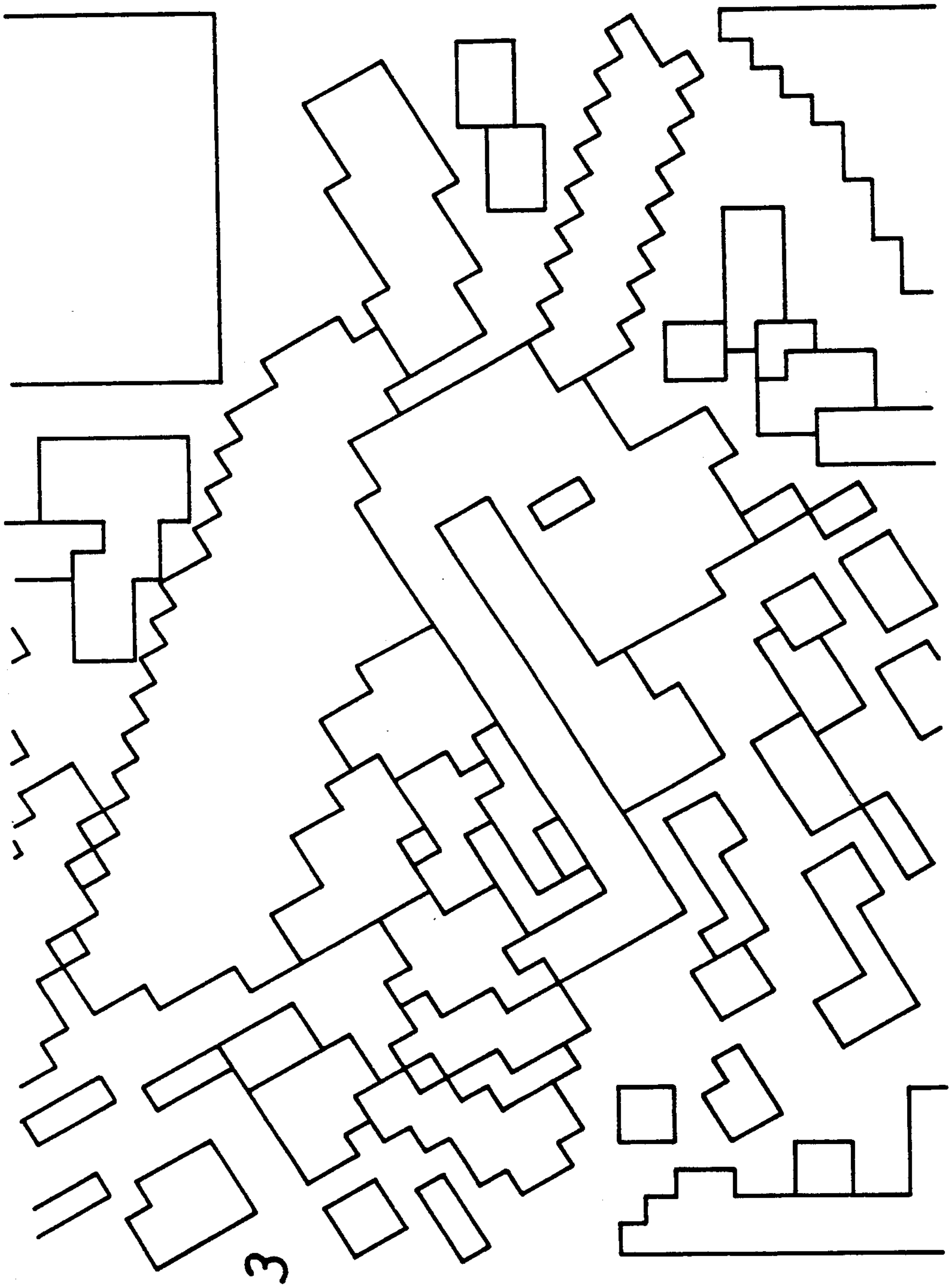
FIG. 3 shows an alternative form of base sheet.
Figure 4B:
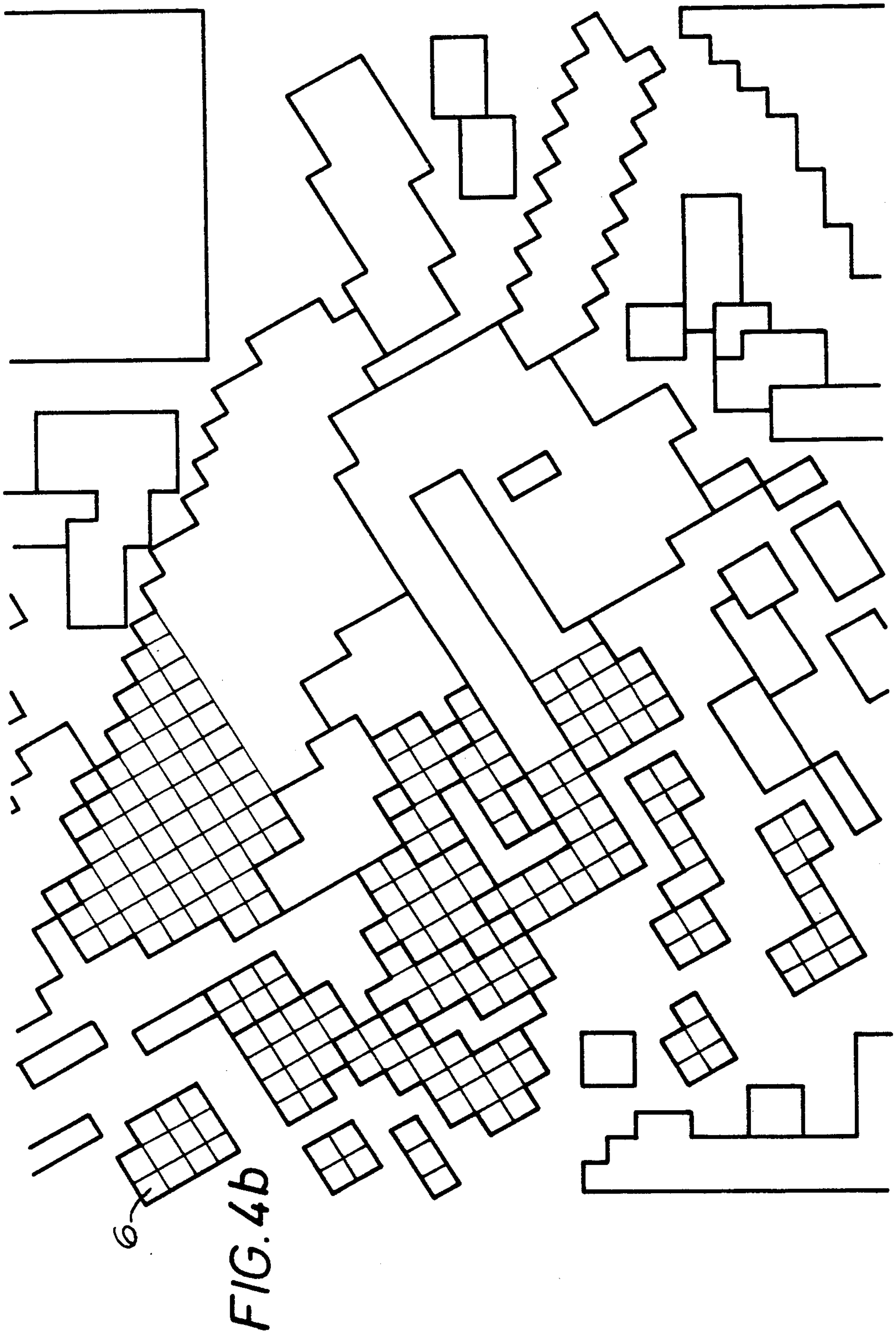
FIG. 4B shows a base sheet corresponding to that of FIG. 3 after the application of some filling elements.

In the arrangement of FIG. 1 the outline is quite similar to that of the intended final picture. As shown in the example of FIG. 3, however, the outline on the base sheet may be made very much more abstract or "cubist", for example, particularly of the filling elements are squares so that the sheet has the appearance of FIG. 4B after some of the filling elements have been applied providing an abstract "mosaic" effect. In this way the final effect of adding the "master graphic" becomes more dramatic.

I claim:

1. A picture making kit comprising a base sheet carrying a predetermined outline or pattern, a plurality of filling elements which can be applied to the pattern by the user, and an overlay sheet which is supperimposed on the base sheet after the filling elements have been applied, and which carries a pattern of transparent, translucent, or cutout "windows" so to create a finished picture made up of separate areas visible through the "windows" of the overlay wherein the filling elements are preformed in uniform shapes which are small relative to the pattern of the base sheet, so that the picture is built up as a "mosaic".

2. A picture making kit according to claim 1, in which the filling elements comprise pieces of coloured paper, cloth, foil or plastic.

3. A picture making kit according to claim 2 further comprising a plurality of backing sheets, each carrying a number of "peelable" filling elements, the rear surface of which carries an adhesive whilst each backing sheet is coated with a suitable release agent.

4. A picture making kit according to claim 1 in which the filling elements comprise pieces of diffraction foil.

5. A picture making kit according to claim 1 in which each "window" of the overlay corresponds to the major part of a corresponding area of the base sheet which is designated to be filled with the filling elements, the remainder of the overlay being opaque so as to cover the unfilled areas of the base sheet.

6. A picture making kit according to claim 1 in which the outline or pattern of the base sheet is larger than the windows of the overlay, so that the final form of the picture only appears clearly after the overlay has been added.

7. A picture making kit comprising:

a base sheet carrying a predetermined outline or pattern;

a plurality of filling elements, wherein at least one of said base sheet and said filling elements include an adhesive means for permanently securing said filling elements to the pattern; and, an overlay sheet which is superimposed on the base sheet after the filling elements have been applied, and which carries a pattern of transparent, translucent or cut-out windows so as to create a finished picture made up of separate areas visible through the "windows" of the overlay.

8. The picture making kit of claim 7 wherein the filling elements are preformed in uniform shapes which are relatively small in relation to the outline or pattern on the base sheet.

9. The picture making kit of claim 7 in which each window of the overlay corresponds to the major part of a corresponding area of the base sheet which is designated to be filled with the filling elements, the remainder of the overlay being opaque so as to cover the unfilled areas of the base sheet.

10. The picture making kit according to claim 7 in which the respective picture areas of the base sheet are larger than the windows of the overlay, so that the final form of the picture only appears clearly after the overlay has been added.

11. The picture making kit of claim 7 further comprising a plurality of backing sheets, each carrying a number a peelable filling elements.

12. A picture making kit comprising:

a base sheet carrying a predetermined outline or pattern;

a plurality of filling elements which can be applied to the pattern by the user; and, an overlay sheet which is superimposed on the base sheet after the filling elements have been applied, and which carries a plurality of spaced transparent, translucent or cut-out windows separated by opaque areas so as to create a finished picture made up of separate spaced areas visible through the "windows" of the overlay, wherein said base sheet outline or pattern bears only a general relationship to the finished picture and said overlay sheet windows cooperate with said base sheet outline or pattern, after the filling elements have been applied, to create the finished picture.

13. The picture making kit of claim 12 wherein the filling elements are preformed in uniform shapes which are relatively small in relation to the outline or pattern on the base sheet.

14. The picture making kit according to claim 12 in which the respective picture areas of the base sheet are larger than the windows of the overlay, so that the final form of the picture only appears clearly after the overlay has been added.

15. The picture making kit of claim 12 further comprising a plurality of backing sheets, each carrying a number of peelable filling elements, a rear surface of each filling element carrying an adhesive while each backing sheet is coated with a suitable release agent.

* * * * *